May 30, 1944.　　　　G. O. HAINER　　　　2,349,860
METHOD OF DETERMINING DIFFERENCES BETWEEN
DEW POINT AND DRY BULB TEMPERATURES
Filed Jan. 21, 1942
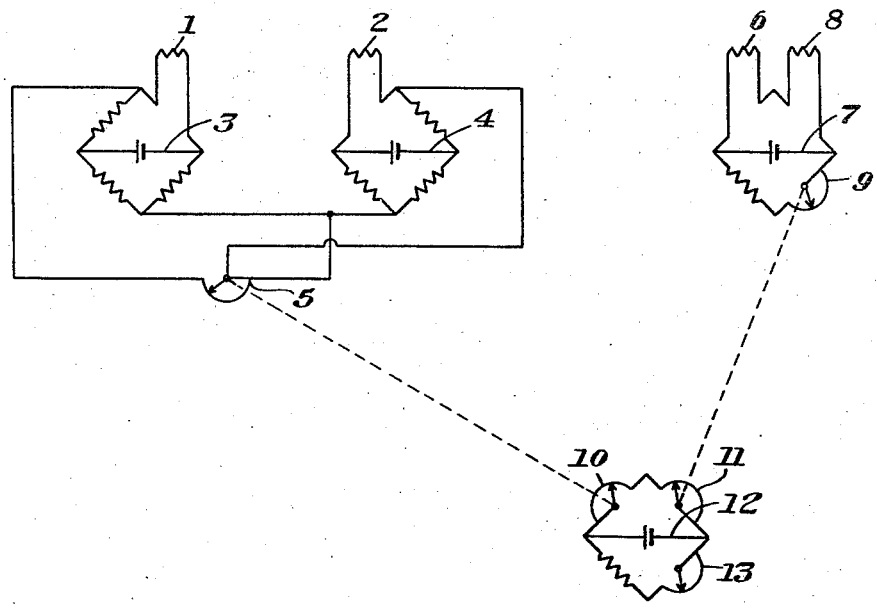
INVENTOR
Glenn Oliver Hainer
by: John E. Jackson
his Attorney.

Patented May 30, 1944

2,349,860

UNITED STATES PATENT OFFICE 2,349,860

METHOD OF DETERMINING DIFFERENCES BETWEEN DEW POINT AND DRY BULB TEMPERATURES

Glenn Oliver Hainer, Pittsburg, Calif.

Application January 21, 1942, Serial No. 427,676

1 Claim. (Cl. 73—51)

This invention is concerned with the problem of determining the differences between the dew point and dry bulb temperatures of a vapor-containing gas when its dry bulb temperature is below the freezing point temperature of its contained vapor.

More specifically, the invention is concerned with the problem of controlling the heating of a warehouse storing steel products, whereby to prevent condensation forming on the steel products so as to cause their rusting. In this connection it is necessary to heat the warehouse so as to keep the steel products at a temperature above the dew point temperature of the warehouse atmosphere, if rusting of the steel products by water condensed thereon is to be avoided.

The above can be done by determining the relative humidity of the warehouse atmosphere, calculating the dew point temperature from the results of this determination, and then comparing this result with the dry bulb temperature of the warehouse atmosphere; the warehouse then being heated as required to keep the dry bulb temperature of its atmosphere above its dew point temperature. However, in following this practice, it is necessary to not only heat the warehouse atmosphere to a temperature above its dew point temperature, but to also heat it above the freezing temperature of water, since the water employed with the wet bulb temperature-determining device which must be used to determine the relative humidity would freeze if the warehouse temperature became less than the freezing temperature of water. It follows that this practice is uneconomical because in wintertime it would frequently be possible to permit the warehouse atmosphere to drop to temperatures below freezing while still obtaining the desired result; the dew point temperature frequently being less than the freezing temperature of water during cold weather.

According to the present invention, a localized portion of the warehouse atmosphere is continuously maintained above the freezing temperature of water; it being possible to do this very economically in wintertime since only a small volume of the atmosphere requires heating. Then the dew point and dry bulb temperatures of this portion of the warehouse atmosphere are determined, and the dew point temperature is subtracted from the dry bulb temperature to determine the difference therebetween. The value of this difference will normally be positive; it being understood that the warehouse atmosphere rarely approaches a saturation point such as would cause the dew point temperature to equal the dry bulb temperature.

Next the temperature of the steel is determined and the value obtained algebraically subtracted from the dry bulb temperature value of the mentioned portion of the atmosphere constantly maintained above the freezing temperature, whereby to obtain the algebraic difference therebetween. The value of this difference will usually be positive, although it may be a negative value if the temperature of the steel exceeds that of the previously mentioned portion of the atmosphere, which might occur in warmer weather when this portion does not require heating. It is unnecessary to take the actual steel temperature since this will normally be the same as the dry bulb temperature of the warehouse atmosphere other than the portion mentioned. Bulky steel products are not capable of heating and cooling so rapidly as is the warehouse atmosphere, but this temperature lagging effect may be compensated for, for example, by taking the temperature of a body having the same lagging characteristics as the steel products stored in the warehouse.

Now by algebraically subtracting the algebraic difference between the dry bulb temperature of the mentioned portion of the warehouse atmosphere and the temperature of the steel products, from the difference between the dew point and dry bulb temperatures of this mentioned portion, it is possible to obtain the difference between the temperature of the steel products, which, except for the lagging effect noted, is the same as the temperature of the warehouse atmosphere, and the dew point temperature of the warehouse atmosphere. It is to be noted that this information is obtained regardless of whether the warehouse atmosphere has a dry bulb temperature less than the freezing temperature of water, because the wet bulb temperature reading necessary to calculate the dew point temperature of the warehouse atmosphere is obtained from the localized portion of the warehouse atmosphere which can be very economically maintained above freezing temperature. This feat is made possible because the dry bulb temperatures cancel out in the calculations.

In case the result of the foregoing is a negative value, it will be known that the temperature of the steel products is less than the dew point temperature of the warehouse atmosphere, and that condensation on the steel products is taking place. This should be prevented by keeping the warehouse atmosphere heated to a temperature sufficient to keep the steel products at a temperature such that the value mentioned will always be a positive quantity by a safe factor.

It is obvious that the method disclosed is of value not only in connection with the specific example described, but whenever it is necessary to determine the difference between the dry bulb and dew point temperatures of any vapor-containing gas having a dry bulb temperature that sometimes, at least, is less than the freezing temperature of its contained vapor. In such an instance, it will not be necessary to do anything other than take a direct reading of the dry bulb temperature of the gas; the temperature lag involved in the case of massive bodies not being involved.

The method that has been disclosed may be applied to automatic systems of mechanical, hydraulic, and electrical types. An embodiment of the last type is schematically disclosed by the accompanying drawing.

This drawing illustrates electrically responsive dry and wet bulb temperature-reading devices 1 and 2, respectively, arranged in simplified bridge circuits 3 and 4, respectively, which circuits are interassociated by an adjustable voltage divider 5. This voltage divider may be calibrated to indicate the difference between the two temperatures or, in other words, the relative humidity. It is to be understood that for a fixed relative humidity there is substantially a constant difference between the dew point and the dry bulb temperatures over a considerable temperature range. Therefore, by measuring the relative humidity in the manner disclosed, each reading obtained can be made to represent a difference in temperature between the dry bulb and dew point.

A second electrically responsive dry bulb temperature-measuring device 6 is arranged in a bridge circuit 7 with a second similar device 8 arranged to measure either the temperature of the steel products or the dry bulb temperature of a gas. The devices 1, 2, and 6 are those that are arranged in the localized portion of the atmosphere that is constantly maintained above the freezing temperature of the liquid which must necessarily be used in connection with the device 2. The bridge circuit 7 includes an adjustable voltage divider 9, which permits its balancing, and which is calibrated to read in terms of the algebraic difference between the temperatures obtained by the devices 6 and 8.

The dividers 5 and 9 are shown as respectively being mechanically coupled to two voltage dividers 10 and 11, arranged in a bridge circuit 12 which can be balanced by an adjustable voltage divider 13, the latter being calibrated to read in terms of the algebraic difference between the readings obtained from the dividers 5 and 9. Obviously, the divider 13 may be associated with regulating devices for turning on and off the heat in a warehouse, or for heating or cooling a body of gas.

Automatic equipment for carrying out this method is commercially available. This takes the form of automatic potential comparison devices associated with the necessary electrically responsive units.

I claim:

The method of determining the difference between the dew point and dry bulb temperatures of the atmosphere of a warehouse when the dry bulb temperature of the atmosphere is below the freezing temperature of its contained vapor comprising maintaining a localized portion of the warehouse atmosphere heated above the freezing temperature of water, measuring the dry and wet bulb temperatures of said heated atmosphere, determining the dew point temperature of the vapor of said atmosphere from the values of said dry and wet bulb temperatures, measuring the dry bulb temperature of the unheated portion of the warehouse atmosphere and algebraically subtracting the value of the latter dry bulb temperature from the value of the dew point temperature.

GLENN OLIVER HAINER.